US012228691B2

(12) United States Patent
Calcagni et al.

(10) Patent No.: US 12,228,691 B2
(45) Date of Patent: Feb. 18, 2025

(54) GENERATOR OF ACOUSTIC WAVES

(71) Applicant: ENI S.P.A., Rome (IT)

(72) Inventors: Davide Calcagni, San Donato Milanese (IT); Antonio Carcaterra, Tarquinia (IT); Vincenzo Milluzzo, San Donato Milanese (IT); Simone Baudo, San Donato Milanese (IT)

(73) Assignee: ENI S.P.A., Rome (IT)

( * ) Notice: Subject to any disclaimer, the term of this patent is extended or adjusted under 35 U.S.C. 154(b) by 333 days.

(21) Appl. No.: 17/778,603

(22) PCT Filed: Nov. 20, 2020

(86) PCT No.: PCT/IB2020/060977
§ 371 (c)(1),
(2) Date: May 20, 2022

(87) PCT Pub. No.: WO2021/100015
PCT Pub. Date: May 27, 2021

(65) Prior Publication Data
US 2023/0028192 A1    Jan. 26, 2023

(30) Foreign Application Priority Data

Nov. 21, 2019   (IT) .......................... 102019000021810

(51) Int. Cl.
*G01V 1/133* (2006.01)
*G01V 1/00* (2024.01)
*G01V 1/143* (2006.01)

(52) U.S. Cl.
CPC .............. *G01V 1/133* (2013.01); *G01V 1/143* (2013.01); *G01V 1/001* (2013.01)

(58) Field of Classification Search
CPC ........ G01V 1/133; G01V 1/135; G01V 1/137; G01V 1/001; G01V 1/186; G01S 5/18
(Continued)

(56) References Cited

U.S. PATENT DOCUMENTS 2,083,697 A * 6/1937 Dull ........................ E21C 37/14
137/511
3,454,127 A * 7/1969 Malme ................... G01V 1/387
181/115
(Continued)

FOREIGN PATENT DOCUMENTS

NO            20111675 A      12/2011

OTHER PUBLICATIONS

International Search Report dated Feb. 2, 2021 for PCT Appl. No. PCT/IB2020/060977.
(Continued)

*Primary Examiner* — Forrest M Phillips
*Assistant Examiner* — Joseph James Peter Illicete
(74) *Attorney, Agent, or Firm* — CANTOR COLBURN LLP

(57) ABSTRACT

A generator of acoustic waves for submarine environments has a hollow body that extends along an axis delimited by a first closed end and by a second end that is provided with an acoustic diffuser member. The hollow body has a first cylindrical portion delimited by the first end that houses a first piston and a second cylindrical portion delimited by the second end that houses a second piston in a freely axially sliding manner. The second piston is mechanically free from the first piston and has a face that faces the acoustic diffuser member. An impulsive actuator is configured together with the first piston to move the first piston towards the second piston. An adjustor for a longitudinal motion of the second piston is arranged between the first piston and the second piston.

19 Claims, 5 Drawing Sheets

(58) Field of Classification Search
USPC .................................................. 181/119, 120
See application file for complete search history.

(56) References Cited

U.S. PATENT DOCUMENTS

| | | | |
|---|---|---|---|
| 4,569,412 | A | 2/1986 | Bouyoucos et al. |
| 4,811,815 | A | 3/1989 | Meier et al. |
| 4,991,685 | A | 2/1991 | Airhart |
| 8,570,835 | B2* | 10/2013 | Chelminski ............ G01V 1/135 |
| | | | 367/172 |
| 9,733,378 | B2* | 8/2017 | Carcaterra ........... G01V 1/3843 |
| 9,739,900 | B2* | 8/2017 | Dowle ..................... G01V 1/04 |
| 9,765,754 | B2* | 9/2017 | Carcaterra .............. F03B 17/00 |
| 2014/0043937 | A1 | 2/2014 | Teyssandier et al. |

OTHER PUBLICATIONS

Written Opinion Report dated Feb. 2, 2021 for PCT Appl. No. PCT/IB2020/060977.
Chinese First Office Action dated Mar. 21, 2024 from corresponding Chinese Patent Application No. 202080080488.7, 29 pages.
Hendra et al.; "Applying of Piston Mechanism Design Used in the Wavelength Electrical Generating of Ocean for Fishing Communities", Advanced Materials Research, vol. 918 (2014), pp. 73-78.
Xiaji; "Study on Seismic Source Characteristics of Large-Capacity Air Gun"; Full text data of doctoral dissertations in China Library Basic Science, Issue 2, International Earthquake Dynamics, China Earthquake Administration, Harbin 150080, 2018, 6 pages.

* cited by examiner

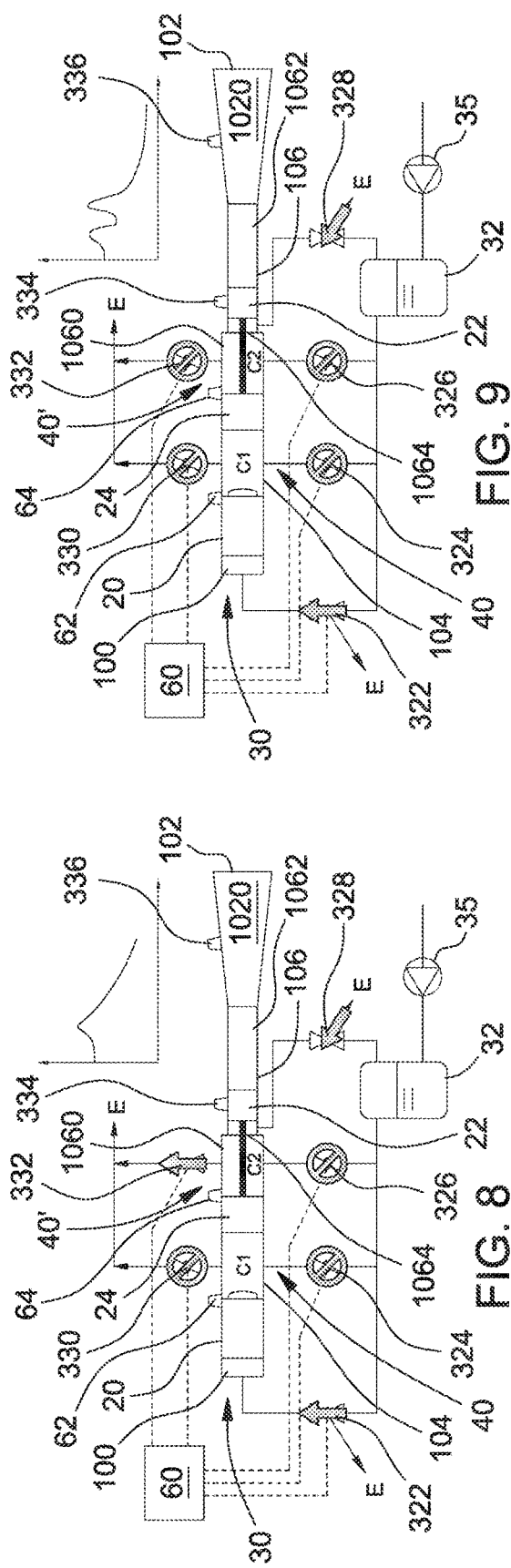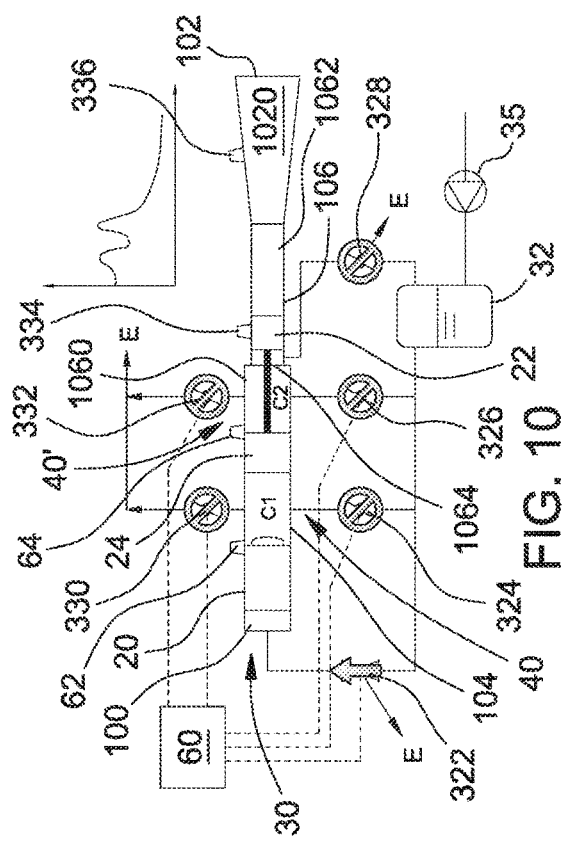

GENERATOR OF ACOUSTIC WAVES

CROSS-REFERENCE TO RELATED APPLICATIONS

This application is a national stage application, filed under 35 U.S.C. § 371, of International Patent Application No. PCT/IB2020/060977, filed on Nov. 20, 2020, that claims priority from Italian Patent Application No. 102019000021810 filed on Nov. 21, 2019, the entire disclosure of each of which is incorporated herein by reference.

BACKGROUND OF THE DISCLOSURE

1. Field of the Disclosure

The present disclosure relates to a generator of acoustic waves. In particular, the present disclosure refers to a generator of acoustic waves for submarine applications. More in detail, the present disclosure refers to a generator of acoustic waves that can be used to perform submarine explorations in full respect of ecosystems populated by marine mammals.

2. Description of Related Art

In submarine explorations industry it is known the use of acoustic waves to map the seabed, classify the potential risks thereof for navigation, identify submerged objects and locate oil and gas fields. In such sector, instruments are used exploiting the reflections of the acoustic waves on the seabed to obtain possible information on potential oilfields below the oceanic seabed, deeper than 10 km. One of the most used instruments in this kind of activity are the so-called air-guns, compressed air cannons whose function is to generate acoustic waves. Such devices are used alone or in an array in combination with the so-called "sonars" to investigate the structure of the seabed by studying the reflected wave. Sonar, or echo sounder, is a word which summarizes the expression "sound navigation and ranging", a technique used to detect the presence and position of bodies at least partially buried, and, therefore, it can be used as an acoustic locating instrument. As known, the submarine world is populated by creatures emitting sounds and, thereby, detectable by "sonars". Among these creatures it is worth mentioning cetaceans, mammals producing acoustic waves with an intensity which is often very high and, therefore, easily detectable by sonars. Cetaceans, in particular, are very sensitive to the acoustic wave emissions produced also by human activities, so much that such emissions are considered responsible of producing serious disorders to such species. In particular, some researches have related cetacean stranding with concurrent military navy exercises.

Based on what above described, it would be desirable to provide a generator of acoustic waves which, besides limiting and possibly overcoming the typical above illustrated drawbacks of the prior art, defines a new standard requirement for the equipment to be used in marine explorations. Therefore, the effort by technical designers of equipment for exploring the seabed searching for oil and gas fields based on the use of acoustic waves aims at finding solutions which enable combining research efficiency and respect for the fauna populating it.

SUMMARY OF THE DISCLOSURE

The present disclosure relates to a generator of acoustic waves. In particular, the present disclosure refers to a generator of acoustic waves for submarine applications. More in detail, the present disclosure refers to a generator of acoustic waves that can be used to perform submarine explorations fully respecting submarine fauna encountered and fully ensuring its respective safety.

The above mentioned problems are solved by the present disclosure according to at least one of the following claims.

According to an embodiment of the present disclosure a generator of acoustic waves for submarine applications is provided, wherein a hollow body is developed along an axis and is delimited by a first closed end and by a second end provided with an acoustic diffuser member; the said hollow body presenting a first cylindrical portion delimited by the said first end and housing a first piston and a second cylindrical portion delimited by the said second end and housing a second piston in a freely axially sliding manner; the said second piston being mechanically free from the said first piston and presenting a face facing the said diffuser member; impulsive actuating means being associated with the said first piston to move it towards the said second piston; longitudinal motion adjustment means of the said second piston being arranged between the said first piston and second piston.

In some embodiments of the present disclosure the said generator comprises adjustment means provided with a third piston movable along the said first portion and the said second portion.

In other cases, the generator comprises a control unit electrically connected to the said adjustment means.

Advantageously, the said adjustment means are of the type with concentrated parameters and comprise a linear damping member adjustable and coupled in parallel with a linear elastic member.

In some cases, the said actuating means comprise a first tank, a compressor fluidly connected to said first tank and electronically connected to said control unit, a first valve electronically controlled by the said control unit and located between the said first tank and the said hollow body behind the said first piston to fluidly drive it along the said first portion.

Furthermore, the said first portion is provided with a first pressure sensor located upstream of said third piston and the said second portion is provided with a second pressure sensor located downstream of the said third piston; the said first sensor and second sensor being electronically connected to the said control unit.

In particular, said first portion is associated to a discharge valve arranged between the said first piston and third piston.

According to a variant of the present disclosure, the said adjustment means comprise a rod which rigidly connects the said third piston to the said second piston and modulating means of the pressure acting on the said second piston with distributed parameters, electronically controlled and arranged along said hollow body upstream and downstream of the said third piston.

In an embodiment, the said second portion has a first part with a cross-section substantially identical to the said first portion for housing the said third piston and a second section part with a small cross-section housing the said second piston and bearing the said diffuser member; the said first part and second part being separated by a dividing wall of the said hollow body provided with a hole engaged with the said rod.

In some embodiments of the present disclosure, said actuating means comprise a second tank fluidly connected to the said hollow body through the interposition of a second valve electronically controlled by the said control unit and hydraulically to a pump, electronically controlled by the said control unit.

In some cases, the said modulating means comprise a third valve electronically controlled by the said control unit arranged between the said second tank and the said first portion between the said first piston and third piston; a fourth valve electronically controlled by the said control unit arranged between the said second tank and the said first part; a fifth valve electronically controlled by the said control unit arranged between the said second tank and the said second part.

In other cases, the said modulating means comprise a first discharge valve electronically controlled by the said control unit and a second discharge valve electronically controlled by the said control unit arranged between the said first cylindrical portion and the said first part; a third sensor electronically controlled by the said control unit being associated with the said second part between the said third piston and the said second piston; a fourth sensor being associated with the said diffuser member and controlled by the said electronic control unit.

Advantageously, the said actuating means comprise at least one electrodynamic actuator associated with at least one of said first piston, second piston, third piston for the respective independent actuation.

Furthermore, the said generator comprises acoustic detection means of marine mammals at a relative distance from the said diffuser member; the said control unit being electronically connected to the said actuating means and to the said detection means in such a way that the said control unit is able to condition respective displacement parameters of the said second piston on the basis of detecting the presence of mammals around the said diffuser member by the said detection means.

According to an implementation of the present disclosure it is provided a method for generating acoustic waves in submarine environments through a first piston housed inside a hollow body developed along an axis and delimited longitudinally by a first closed end and by a second end provided of an acoustic diffuser member; the said hollow body presenting a first cylindrical portion delimited by the said first end and housing a first piston and a second cylindrical portion delimited by the said second end and housing a second piston in a freely axially sliding manner; the said second piston being mechanically free from the said first piston and presenting a face facing the said diffuser member; impulsive actuating means being associated with the said first piston to move it towards the said second piston; the said method comprising the steps of longitudinally operating the said first piston towards the said second piston through the said actuating means; the said method being characterized in that it comprises a step of conditioning a longitudinal motion of the said second piston from and towards the said first piston through adjustment means interposed between the said first piston and said second piston.

In a variant of the present method, the said adjustment means comprise a third piston arranged between the said first piston and second piston to isolate a first air chamber and a second air chamber separated and placed in series inside said hollow body.

In some cases, the method comprises a step of fluidly sealing the said second chamber, a step of pressurizing the said first chamber and discharging the said first end.

In other cases, the method comprises a step of fluidly sealing the said first end, of discharging the said first chamber and of pressurizing the said second chamber.

In other cases, the said second chamber is divided into two parts of different transverse sections by a wall placed between the said third piston and the said second piston; the said method comprising a step of pressurizing the said first end, discharging the said first chamber, discharging the said first part and pressurizing the said second part.

In other cases, the said second chamber is divided into two parts of different transverse sections by a wall placed between the said third piston and the said second piston; the said method comprising a step of pressurizing the said first end, discharging the said first chamber, isolating said first part and pressurizing the said second part.

In particular cases, the said second chamber is divided into two parts of different transverse sections by a wall placed between the said third piston and the said second piston; the said method comprising a step of pressurizing the said first end, isolating the said first chamber, discharging the said first part and pressurizing the said second part.

In a different application of the present method the said second chamber is divided into two parts of different transverse sections by a wall placed between the said third piston and the said second piston; the said method comprising a step of pressurizing the said first end, isolating the said first chamber, isolating the said first part and pressurizing the said second part.

In other cases, the said second chamber is divided into two parts of different transverse sections by a wall placed between the said third piston and the said second piston; said method comprising a step of pressurizing said first end, isolating said first chamber, isolating said first part and isolating said second part.

BRIEF DESCRIPTION OF THE DRAWINGS

Further characteristics and advantages of the generator of acoustic waves according to the present disclosure will be more evident from the following description, set forth referring to the enclosed figures which show some non-limiting embodiments thereof, where identical or corresponding parts of the generator are identified by the same reference numbers. In particular.

DETAILED DESCRIPTION OF THE DISCLOSURE

Figure 1:
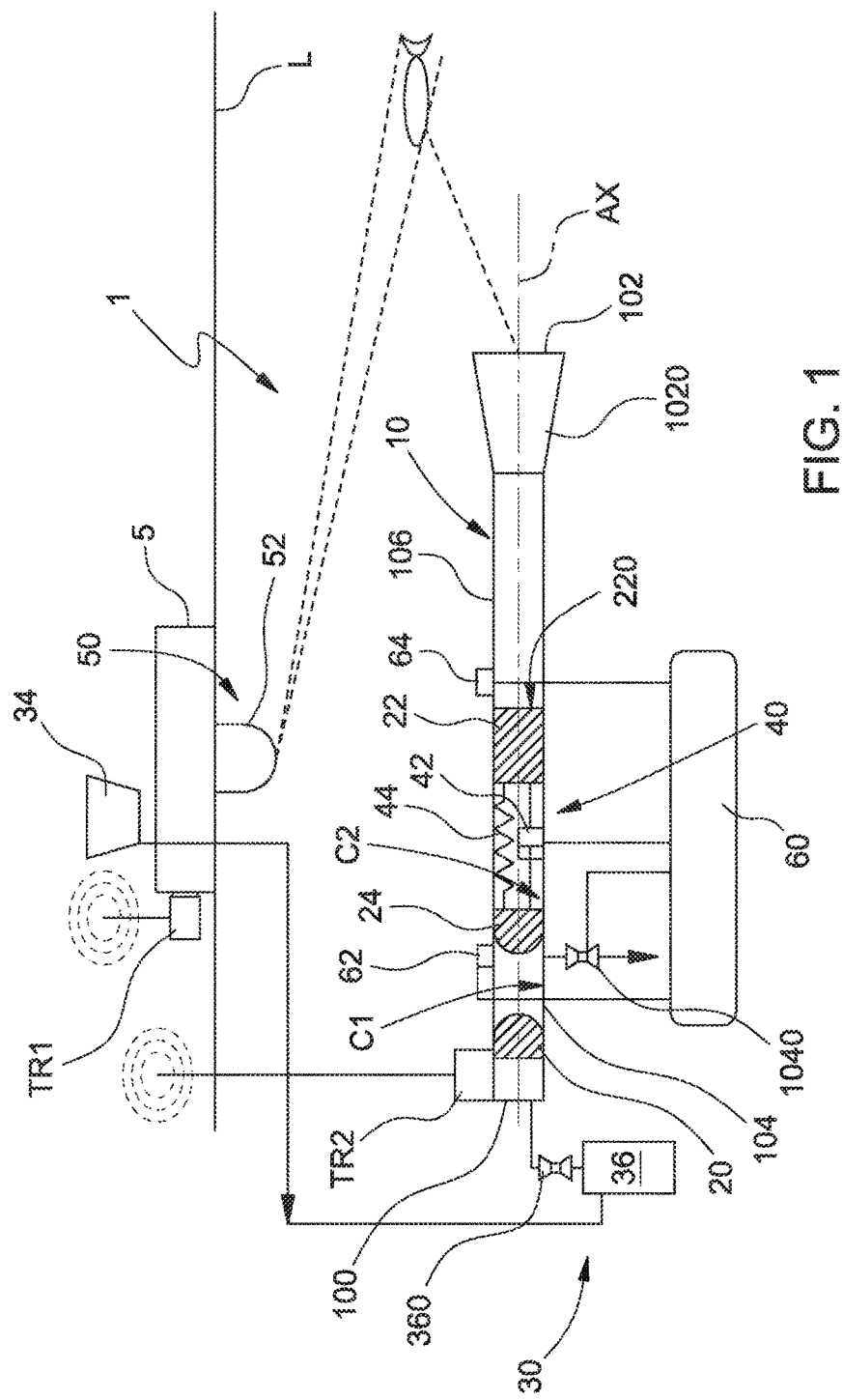
FIG. 1 is a schematic view of a first preferred embodiment of a generator of acoustic waves according to the present disclosure.

In FIG. 1, 1 indicates as a whole, a generator of acoustic waves with a spectrum adjustable to be suitably used in explorative missions on the seabed, with the purpose of finding out new oil and/or gas fields. Such generator 1 comprises an elongated hollow body 10 longitudinally developed along an axis AX and delimited by a first closed end 100 and by a second end 102 provided with an acoustic diffuser member 1020. The hollow body 10 further presents a first cylindrical portion 104 which is delimited by the first end 100 and housing a first piston 20, or impacting piston, and a second cylindrical portion 106 in turn delimited by the second end 102. Such second portion 106 houses a second piston 22, or pumping piston, in a freely axially sliding manner where such second piston 22 is mechanically free from the first piston 20 and presents a face 220 (FIG. 1) facing towards the diffuser member 1020.

It must be specified that in the following description neither fluidly connecting tracts carrying valves nor other fluid components will be mentioned but only shown, unless mentioning such connecting tracts is deemed as necessary to maximize understanding of the disclosure. The same approach will be applied to the electronic connections among components.

The generator 1 further comprises an impulsive actuating unit 30 which is associated with the first piston 20 to move it towards the second piston 22. The actuating unit 30 can indifferently be of the fluid, electric e or mixed actuation type. Always referring to FIG. 1, the first actuating unit 30 comprises a first tank 36, a compressor 34 fluidly connected to the first tank 36; a first actuating valve 360 arranged between the first tank 36 and the hollow body 10 behind the first piston 20 to fluidly actuate it along the first portion 104.

The generator 1 further comprises an adjustment unit 40 associated to the first portion 104 between the first piston 20 and second piston 22 to modulate, in use, movements of the second piston 22 with respect to the first piston 20. Such adjustment unit 40 comprises a third piston 24, or hammer piston, arranged in the first portion 104 between the first piston 20 and the second piston 22, where such third piston 24 is also free from the first piston 20. The presence of such third piston 24 causes the formation of a first isolated air chamber C1 in the hollow body 10 between the first piston 20 and the third piston 24 and a second isolated air chamber C2 in the hollow body 10 between the third piston 24 and the second piston 22, so that such first and second air chambers are separated and in series. Such adjustment unit 40 further comprises a linear adjustable damping member 42, such as but not limited to, pressurized, and a linear elastic member 44 where the damping member 42 and the elastic member 44 are arranged in parallel between the third piston 24 and the second piston 22.

The generator 1 further comprises a control unit 60 which is electrically connected to the actuating unit 30 and the adjustment unit 40, such that the control unit 60 is adapted to condition respective displacement parameters of the second piston 22 defined based on specific operation requirements.

In particular, the compressor 34 is fluidly connected to the first tank 36 and electronically to the control unit 60, the first valve 360 is electronically controlled by the control unit 60. Normally, it is useful that the compressor 34 is carried by the same ship 5; however, choosing to remote control the compressor 34 relative to the hollow body 10 is not a limit to the scope of the present disclosure.

The first portion 104 is provided with a first pressure sensor 62 associated to the first portion 104 and arranged upstream of the third piston 24 while the second portion 106 is provided with a second pressure sensor 64 associated to the second portion 106 downstream of the second piston 22; the first sensor 62 and the second sensor 64 are electronically connected to the control unit 60. Furthermore, a discharge valve 1040, controlled by the control unit 60, is associated to the first portion 104, between the first piston 20 and the third piston 24.

The generator 1 further comprises an acoustic detection unit 50 of marine mammals that is arranged, in use, to determine a relative distance of such mammals from the diffuser member 1020.

Always referring to FIG. 1, the detection unit 50 comprises a sonar 52 that is remote with respect to the hollow body 10 and, if necessary, carried on-board a ship 5, housing operators in charge of managing the exploration mission wherein the generator 1 is used under the waterline, hence under the sea level L. In order to be suitably operative, the ship 5 is further provided with a first transceiver TR1 and the hollow body 10 carries, in turn, a second transceiver member TR2, matched with the first transceiver TR1 and connected to the control unit 60, in order to allow an exchange of digital information among operators on-board the ship and the control unit 60 of the generator 1.

Furthermore, the control unit 60 is connected to the detection unit 50 and is arranged to condition operation parameters of the generator 1, in particular the actuating unit 30 and the adjustment unit 40, on the basis of surveys of the presence of mammals around the diffuser member 1020 performed, as obvious, by the detection unit 50.

The use of the generator 1 of acoustic waves can be easily understood and does not require any further explanation. However, it can be useful to specify that the longitudinal movement of the second piston 22 in the second portion 106 can be determined by applying an appropriate pressure to the hollow body 10 in the part of the first portion 104 located upstream of the first piston 20 through the compressor 34 and the valve 360 with the intervention of the adjustment unit 40 under the control of the control unit 60, selectively taking account of information detected by the detection unit 50. The cooperation of these components can be mathematically synthesized in a transfer function F1, able to describe the action performed by the adjustment unit 40 to move the second piston 22 and, in particular, to compress the fluid portion contained between the first piston 20 and the third piston 24 in order to make it possible to the second piston 22 to emit pressure waves through the respective face 220 within the diffuser member 1020. Considering what above described, the transfer function F1 will comprise the operating parameters of the damping member 42 of the adjustment unit 40 (FIG. 1), of the discharge valve 1040 by the control unit 60, and selectively but not-limiting, of the contribution by information detected by the detection unit 50. If deemed as useful, the transfer function F1 can be completed with the operation parameters of the compressor 34, and of course, of the first valve 360.

Obviously, the marine system is constantly moving and water pressure fluctuations with which face 220 is interfaced will condition the type of acoustic emission of the generator 1. Setting the control unit 60 can selectively take into account this circumstance and possibly require an operator intervention.

It is also clear that modifications and variants can be brought to the herein described and shown generator 1 of acoustic waves without departing from the protection scope of the present disclosure. For example, in FIG. 2, the actuating unit 30 is modified and comprises a second tank 32 which replaces the first tank 36 and is fluidly supplied by a pump 35 (which replaces the compressor 34 of FIG. 1), in addition to a second actuating valve 322, which fluidly connects the hollow body 10 upstream of the first piston 20 with the second tank 32 and is electronically controlled by the control unit 60.

On the other hand, the hollow body 10 is consequently modified if compared to that of FIG. 1 and has the second chamber C2 divided in two parts with different transverse sections by an intermediate wall 1064: a first part 1060 of the second portion 106 housing the third piston 24, and thereby having a cross-section substantially identical to that of the first portion 104, and a second part 1062 of the same second portion 106, whose cross-section is smaller than the first one to house a second piston 22 with a smaller cross-section than that of the second piston 22 of FIG. 1. Also the adjustment unit 40 is sensibly modified, as it now comprises only a connecting member placed between the third piston 24 and the second piston 22, constituted by a rigid rod 41 engaging the wall 1064 in a hole 1066, fluidodynamically insulating the first part 1060 of the second part 1062. The presence of the rod 41 eases the contribution of determining mechanical parameters of the transfer function F2 associated to such version of the generator 1, where the fluid parameters of the adjustment unit 40 depend on the conformation of the hollow body 10 and on the presence of a plurality of supply and/or discharge valves which put the hollow body 10 in hydraulic communication with the tank 32 or the discharge, and are electronically connected to the control unit 60 for the respective operability/switching, as will be better described hereinafter. To this respect, always referring to FIG. 2, the adjustment unit 40 comprises a modulation unit 40' of the pressure acting on the second piston 22 electronically controlled through the control unit 60 arranged along the hollow body 10 upstream and downstream of the third piston 24.

The modulating unit 40' comprises a third valve 324 electronically controlled by the central unit 60, which replaces the discharge valve 1040 of the embodiment of the disclosure visible in FIG. 1 and connects the second tank 32 to the first portion 104 between the first piston 20 and the third piston 24. The modulating unit 40' further comprises a fourth actuating valve 326 which is electronically controlled by the control unit 60 and connects the second tank 32 to the first part 1060; a fifth actuating valve 328 which is electronically controlled by the control unit 60 and connects the second tank 32 to the second part 1062; a first discharge valve 330 electronically controlled by the control unit 60 hydraulically connected to the first cylindrical portion 104 and the second discharge valve 332, also electronically controlled by the control unit 60, hydraulically connected to the first part 1060; the first sensor 62, the second sensor 64, a third sensor 334 associated to a second part 1062 and a fourth sensor 336 associated to the diffuser member 1020.

Figure 2:
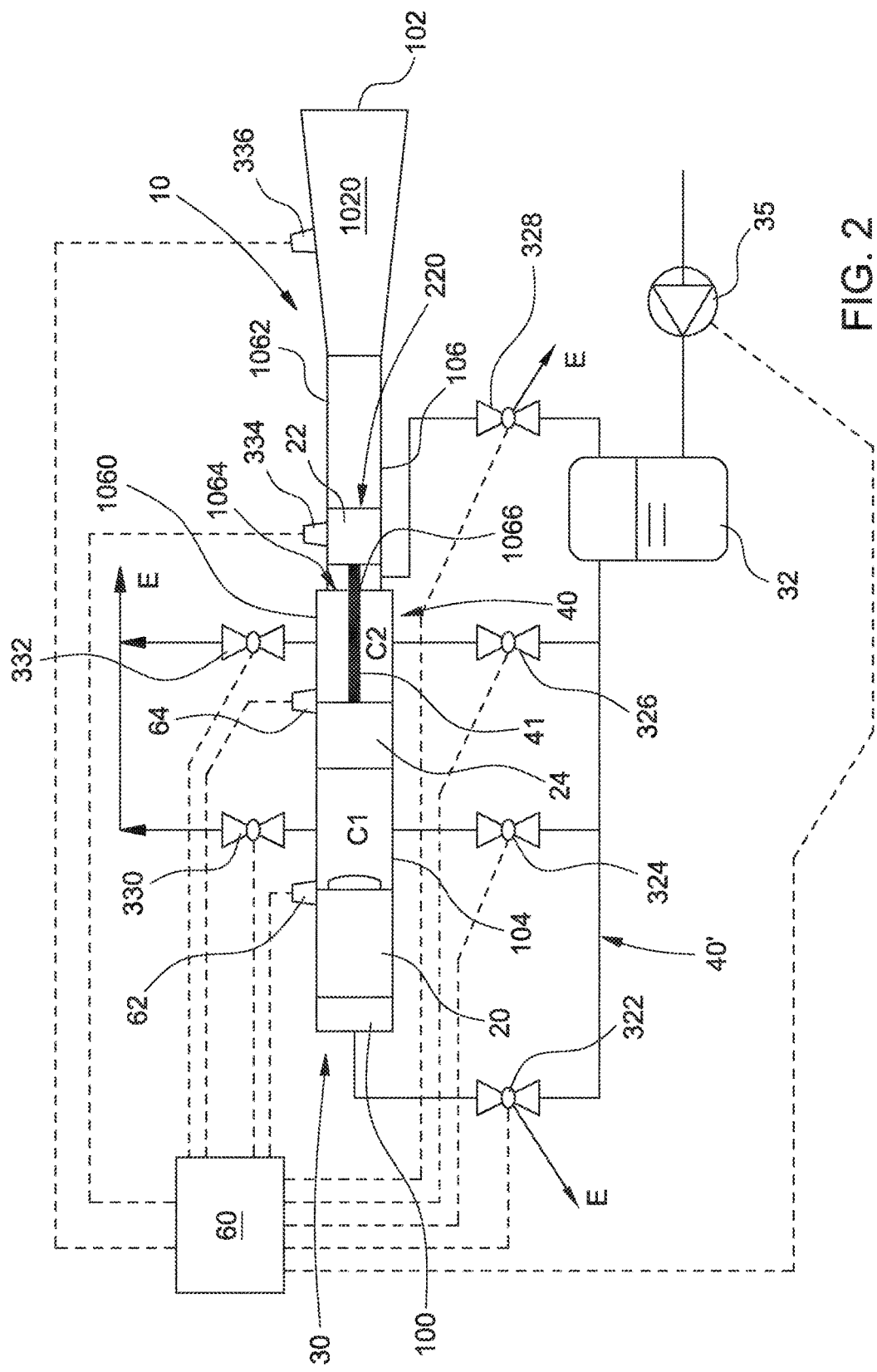
FIG. 2 is a schematic view of a second preferred embodiment of a generator of acoustic waves according to the present disclosure.
Figure 3:
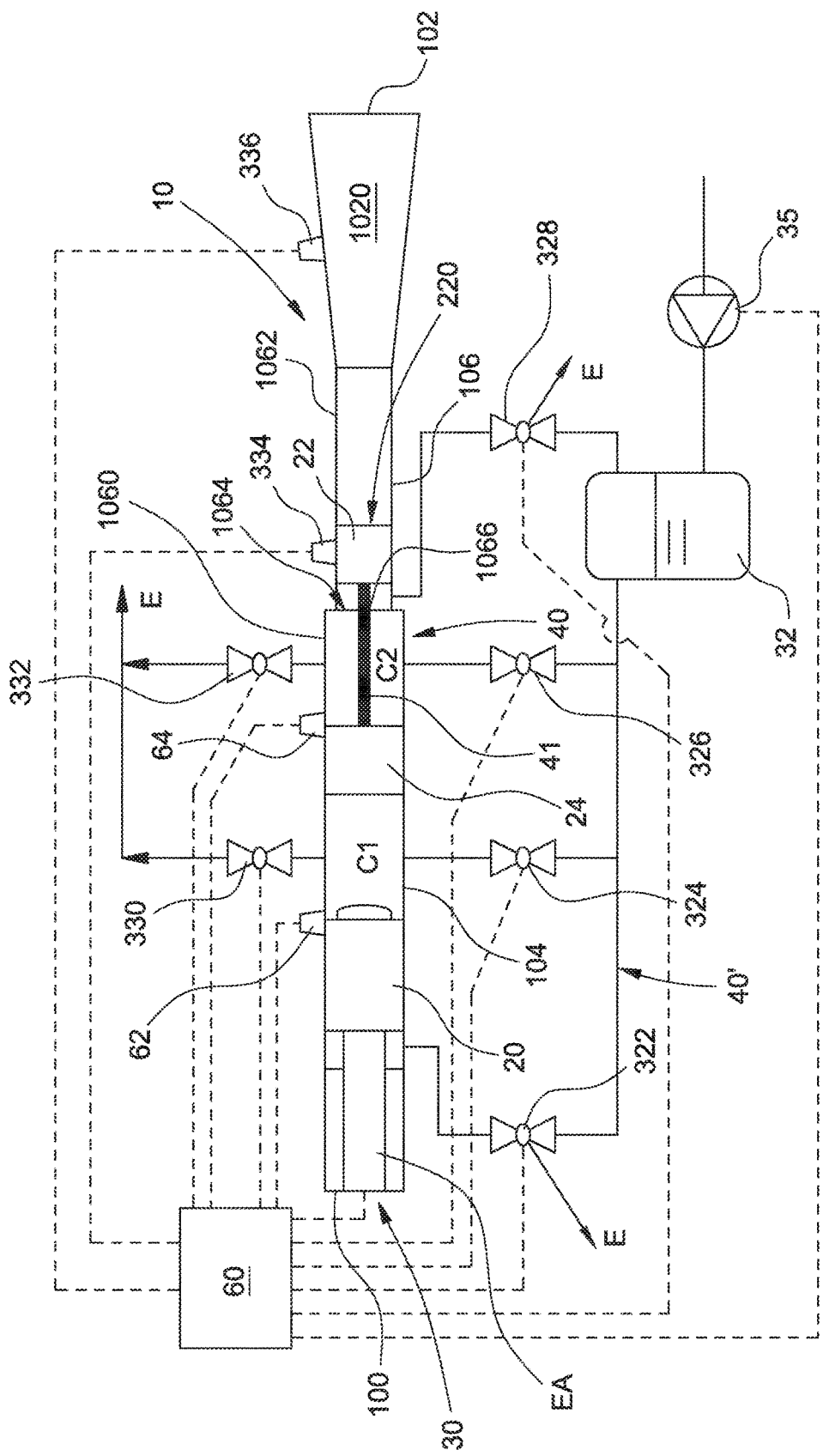
FIG. 3 is a schematic view of a third preferred embodiment of a generator of acoustic waves according to the present disclosure FIGS. 4-10 schematically show adjusting modes of components of the generator of FIG. 2.

Valves 322, 330, 332 and 328 are selectively connected to a common discharge E, where letter E is shown in more than a position in FIGS. 2 and 3 for an easy illustration.

With reference to such version of the generator 1 it must be noted that the setting up of the transfer function F2 which determines the acoustic wave emission spectrum, can take into account, in a selective though non-limiting manner, the actual presence of cetaceans detected by the acoustic detection unit 50 around the diffuser member 1020. In any case, the transfer function F2 takes into account the contributions of the third valve 324, fourth valve 326, fifth valve 328, of the first discharge valve 330 and of the second discharge valve 332, by the first sensor 62, second sensor 64, third sensor 334 and fourth sensor 336, as well as by pressure values existing in the chambers detached from the wall 1064 between the third piston 24 and the second piston 22, also connected by the rod 41.

In this case also, the transfer function F2 can be completed with the operation parameters of the pump 35, of the second valve 322 and of the second tank 32.

The use of the version of the generator 1 according to FIG. 2 can be easily understood. However it might be worth specifying that it is necessary to apply a method which is different each time to condition a longitudinal motion of the second piston 22 from and to the said first piston 20 with the intermediate action of the third piston 24 in order to obtain different purposes.

Figure 4:
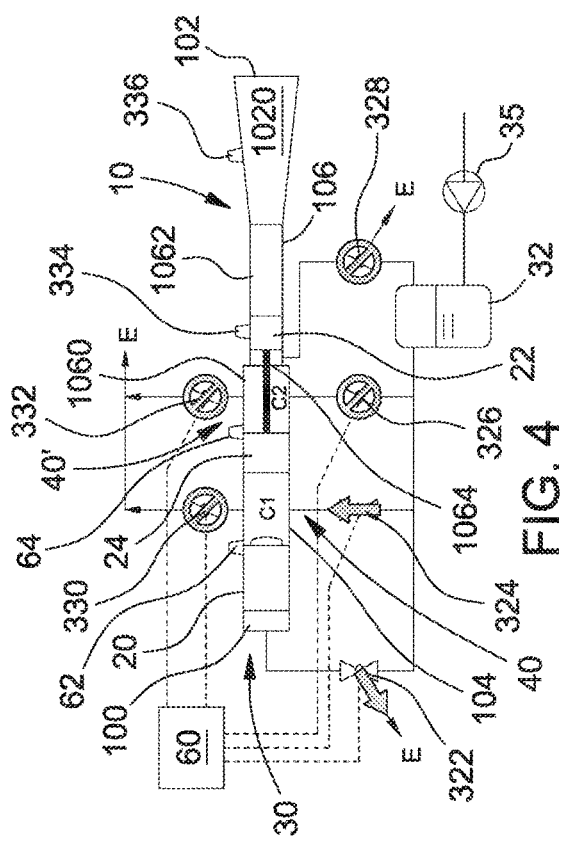

For example, each time that downstream of a wave emission by the second piston/pump piston 22 it is required to reactivate the first piston 20, taking it to the first end side 100 of the hollow body 10, it is necessary to isolate the second chamber C2, pressurize the first chamber C1 and discharge the first end 100, as shown in FIG. 4. For this purpose, it is necessary to arrange the control unit 60 in such a way that the first discharge valve 330, the second discharge valve 332, valves 326 and 328 are closed, the valve 322 is discharged and the valve 324 is opened. Afterwards, the control unit 60 is required to activate the pump 35 to supply air to the first portion 104, in particular between the first piston 20 and the third piston 24, to move the first piston 20 into the most remote position relative to the diffuser member 1020.

Figure 5:
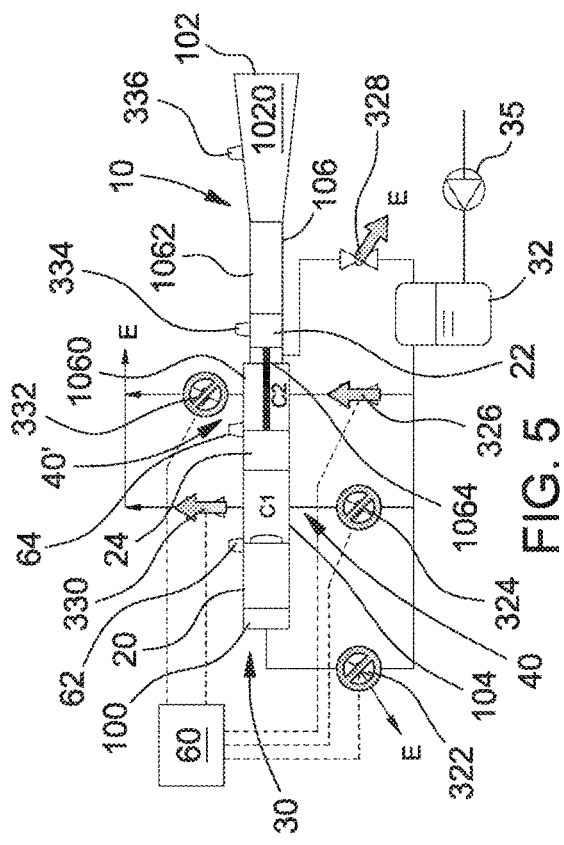

In case, always downstream of a wave emission by the second piston/pump piston 22, it is desired to reactivate again the assembly of the third piston 24 and second piston 22, positioning it again at the first end side 100 of the hollow body 10, with the left face of the second piston 22 substantially contacting the wall 1064, it is necessary to fluidly isolate the first end 100, discharge the first chamber C1 and pressurize the second chamber C2 (FIG. 5). In practice, the central unit 60 must be arranged in order to leave the second discharge valve 332 closed, open the first discharge valve 330, adjust the discharge of the fifth valve 328, close the second valve 322 and the third valve 324 and open the fourth valve 326, in order to enable the pump 35 to supply air to the first part 1060 of the second portion 106. Thus, the assembly of pump and hammer pistons 24 and 22 will have been positioned in the most remote position relative to the diffuser member 1020, and, at this point, the generator 1 is activated to emit a pressure wave through the face 220 of the second piston 22.

Figure 6:
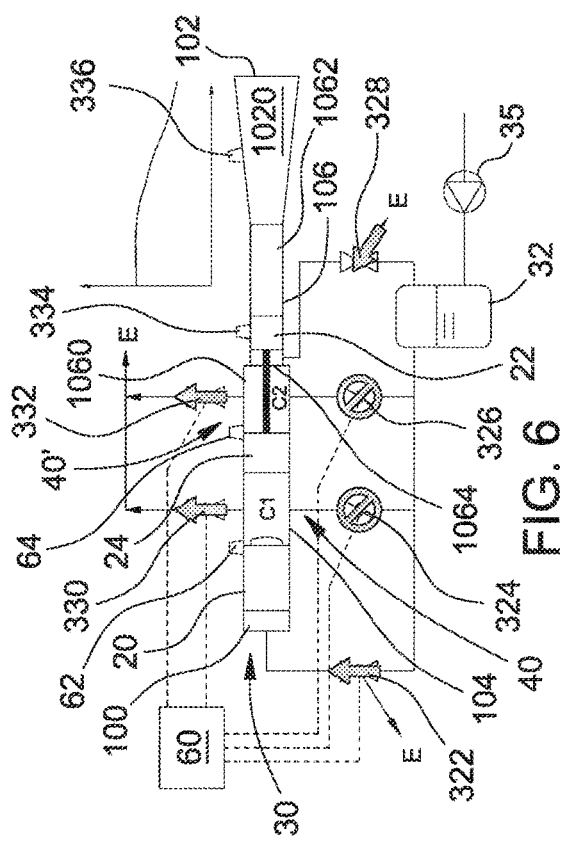

In order to make the release of energy from the face 220 of the second piston 22 to the water contained in the diffuser member 1020 as much violent as possible after the impact between the first piston 20 and the third piston 24 (FIG. 6), it is necessary to pressurize the first end 100, discharge the first chamber C1, discharge the first part 1060 and pressurize the second part 1062. In practice, the central unit 60 is required to control the simultaneous closure of the third valve 324 and fourth valve 326, such to simultaneously open the first discharge valve 330, the second discharge valve 332, the second valve 322 and the fifth valve 328, where the opening of such valve 328 allows to supply air between the wall 1064 and the second piston 22, with the effect of contributing pushing the second piston 22 towards the diffuser member 1020. In that case, it is clear that the first piston 20 moves freely towards the third piston 24 pushed by air delivered by the pump 35 to the first end 100. Thereby, in this case, the method allows preventing an air cushion from forming between the first piston 20 and the third piston 24, which, therefore, is enabled to receive the maximum acceleration from the impact of the first piston 20. The effect is that the face 220 of the second piston 22 emits an acoustic wave of maximum amplitude. By contrast, in case the acoustic detection unit 50 has informed the control unit 60 about the absence of cetaceans around the diffuser member 1020, it is possible to adjust the generator 1 in such a way as to filter the emission of acoustic waves in different ways, some of which are determined by adjustment modes of the valves that are graphically represented in FIGS. 7-10, where arrows placed on the valves indicate the respective activation and the no parking signal indicates prohibition thereof.

Figure 7:
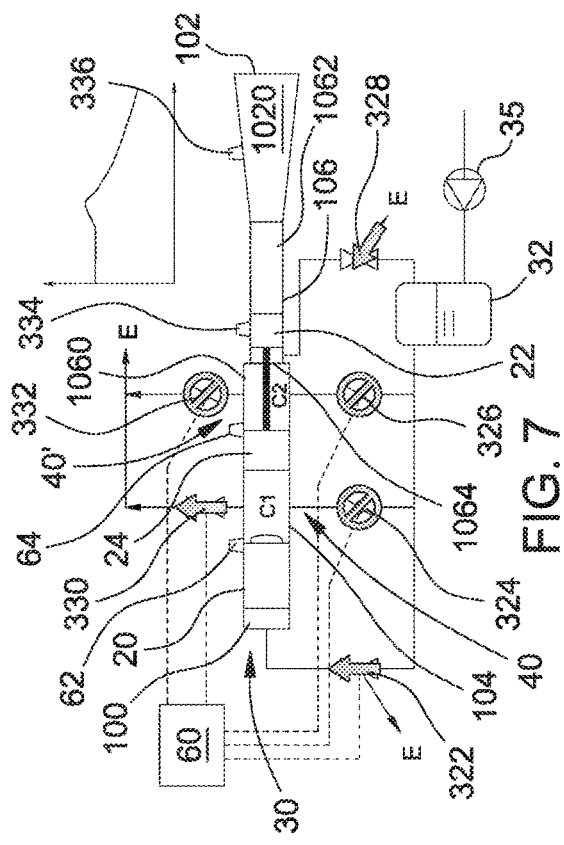

Referring in particular to FIG. 7, it is shown a first variant of the method of use of the generator 1 which enables to damp the emission of acoustic waves or, if preferred, to filter it. In that case, the operation method requires pressurizing the first end 100, discharging the first chamber C1, isolating the first part 1060 and pressurizing the said second part 1062, resulting in the production of an air cushion with increasing pressure inside the second portion 106. To determine this situation the control unit 60 must control simultaneously the closure of the third valve 324 and of the fourth valve 326, as well as the opening of the first discharge valve 330, the opening of the second valve 322 and of the fifth valve 328, the closure of the third valve 324, of the fourth valve 326, of the second discharge valve 332. The impact of the first piston 20 on the third piston 24 remains as much violent as possible, however the presence of the above described air cushion generates an elastic effect in the air between the third piston 24 and the second piston 22 producing resonance. The acoustic spectrum thus has a peak at the resonance frequency, which is followed by a sudden drop once the resonance frequency is overcome.

Referring in particular to FIG. 8, it is shown a second variant of the method of use of the generator 1 enabling to damp the emission of acoustic waves. In this case, it is required to determine the formation of an air cushion between the first piston 20 and the third piston 24; to do that it is required to deliver pressure to the first end 100, isolate the first chamber C1, discharge the said first part 1060 and pressurize the said second part 1062. In practise, the control unit 60 is required to simultaneously control the closure of the first discharge valve 330 and the opening of the second discharge valve 332, leaving the remaining valves in the condition of FIG. 7. In this case, air cushions are determined both between the first piston 20 and the third piston 24 and between the latter and the second piston 22. Thereby in this case as well, the acoustic spectrum has qualitatively a peak, but at a frequency level that differs from that of the previous case.

Referring in particular to FIG. 9, it is shown a third variant of the method of use of the generator 1 enabling to further damp the emission of acoustic waves. In this case, it is required to pressurize the first end 100, isolate the first chamber C1, isolate the first part 1060 and pressurize the second part 1062, determining the formation of an air cushion between the first piston 20 and the third piston 24. In order to determine this situation if compared to the situation shown in FIG. 8, the control unit 60 must control the closure of the second discharge valve 332. In this case, air cushions are determined both between the first piston 20 and the third piston 24 and between the latter and the second piston 22. Thereby the acoustic spectrum has qualitatively two peaks at two new frequency values followed by a sudden drop in the width of the acoustic wave.

Referring in particular to FIG. 10, it is shown a fourth variant of the method of use of the generator 1 which enables to damp to the highest degree of the emission of acoustic waves. In this case, the said end 100 is pressurized, the first chamber C1 is isolated, the first part 1060 is isolated and the second part is isolated 1062. In practise the setting up of the two valves shown in FIGS. 8 and 9 is combined, since the third valve 324, the fourth valve 326, the fifth valve 328, the first discharge valve 330 and the second discharge valve 332 are kept closed. The impact between the first piston 20 and the third piston 24 is damped to the highest degree due to the presence of two air cushions, between the first piston 20 and the third piston 24 and between the third piston 24 and the second piston 22. In addition, the closure of the fifth valve 328 generates a low pressure between the wall 1064 and the second piston 22. Thereby in this case the acoustic spectrum of the acoustic emission has qualitatively two acoustic frequency peaks unlike the spectrum of the previously described solution.

Combinations of different adjustments of the valves of the generator 1 enable to modulate the acoustic spectrum as desired.

With reference to FIG. 3, it is shown a third version of the generator 1, which a transfer function F3 is associated to, which differs from the version F2 of the second version in that the actuating unit 30 comprises at least an electrodynamic actuator EA associated, for example but without limitation, to at least a piston selected from the first piston 20, the second piston 22 and the third piston 24.

Considering the above, the production of acoustic waves by the generator 1 capable of determining seismic events on the seabed through the piston 22 is conditioned by the presence of the adjustment unit 40 and, in other terms, by the transfer functions F1, F2, and F3 describing the behaviour of the second piston 22, thus the type of waves emitted by the diffuser member 1020. Therefore, it might be useful to specify that, regardless of the geometrical dimensions of the hollow body 10 and of the pistons engaging it in the various tracts thereof, the transfer functions F1, F2 and F3 have features which can be modified ad hoc, which, without considering in general the current pressure values in the hollow body 10 upstream of the first piston 20, depend on pressure and mechanical thrust values determined between the third piston 24 and the second piston 22 and, consequently, inside the diffuser member 1020. In particular, it can be stated that such features are, in the case of F1 (FIG. 1), of the fluid and mechanical type with concentrated parameters, as determined by the presence of the mechanical connection between the third piston 24 and the second piston 22 through the linear elastic member 44 and by the fluid connection given by the damping member 42. In the cases of FIGS. 2 and 3 the characteristics are always of the fluid and mechanical type but globally with parameters distributed along the said hollow body 10. In fact, in such cases the mechanical connection between the third piston 24 and the second piston 22 is indeed given by the rod 41 but the fluid connection between the two pistons is mediated by parameters depending on pressure values in the chambers which are obtained in the hollow body 10, respectively between the third piston 24 and the wall 1064 and between the wall 1064 and the second piston 22, by means of actuating the fourth valve 326, the discharge valve 332 and the fifth valve 328.

Always considering what above described, any one of the above discussed versions of the generator 1 can be suitably used to explore specific areas of the seabed in search for oil and gas fields by means of acoustic waves with the certainty of acting in full respect of the fauna swimming around the generator 1, even in case of cetaceans.

It might be useful to specify that it is possible to install in parallel a plurality of devices 1 (array) in order to multiply as desired the acoustic power emitted by a single generator 1. In that case, it can be easily understood that all devices 1 can be connected to the same control unit 60, or, in order to maximize calculation times, a control unit can be provided and electronically connected to all the control units 60 of the installed devices 1.

To conclude, it might be useful to provide some examples of constructive and operative parameter dimensions which have resulted more efficient in generating acoustic waves through the generator 1 with different values of external environmental pressure. The hereinafter tables show some of these combinations, where $C_{stop}$ is the stroke of the second piston 22, $R_w$ is the radius of the pump piston 22, $V_0$ is the speed of the first piston 20, $m_p$ is the mass of the first piston 20 which is equal to that of the assembly of pistons 22 and 24, $p_{ref}$ is the supply pressure of the generator in the chamber 100, $B_{imp}$ the generator emission frequency band, N the number of actuated devices 1 positioned in parallel simultaneously.

| $P_{ref}$ = 30 bar $B_{imp}$ = 250 Hz | |
|---|---|
| N = 1 | N = 1 |
| $C_{stop}$ = 20 cm | $C_{stop}$ = 17.5 cm |
| $R_w$ = 2 cm | $R_w$ = 2.7 cm |
| $V_0$ = 50 m/s | $V_0$ = 43.75 m/s |
| $m_p$ = 7.5 kg | $m_p$ = 14.2 kg |

In order to efficiently produce acoustic waves with a limited mass of the second piston 22, it would be necessary to increase the speed of the third piston 24, however this would involve increasing the longitudinal extension of the hollow body 10. In order to avoid that, it would be necessary to reduce the speed of the third piston 24 and increase the number of devices 1 used in parallel. In case of $p_{ref}$=30 bars, with N=4 the following configuration proved efficient:

| N = 4 | $C_{stop}$ = 15 cm | $R_w$ = 1.9 cm | $V_0$ = 37.5 m/s | $m_P$ = 6.5 kg |
|---|---|---|---|---|

In addition, if increasing the power of acoustic emission is desired, possible values are the following ones:

| $P_{ref}$ = 100 bar $B_{imp}$ = 250 Hz | |
|---|---|
| N = 4 | N = 6 |
| $C_{stop}$ = 25 cm | $C_{stop}$ = 25 cm |
| $R_w$ = 4 cm | $R_w$ = 3.3 cm |
| $V_0$ = 62.5 m/s | $V_0$ = 62.5 m/s |
| $m_p$ = 30 kg | $m_p$ = 20 kg |

The invention claimed is:

1. A generator of acoustic waves for submarine applications, the generator comprising:
    a hollow body that extends along an axis between a first closed end and a second end that is provided with an acoustic diffuser member,
    wherein the hollow body has a first cylindrical portion delimited by the first end that houses a first piston and a second cylindrical portion delimited by the said second end that houses a second piston in a freely axially sliding manner,
    wherein the said second piston is mechanically free from the first piston and has a face that faces the acoustic diffuser member;
    an impulsive actuating means configured together with the first piston to move the first piston towards the second piston;
    means for adjusting a longitudinal motion of the second piston arranged between the first piston and the second piston, and
    a control unit electronically connected to the adjustment means, wherein the adjustment means comprise a rod that rigidly connects a third piston to the second piston and a modulating means or modulating the pressure acting on the second piston, wherein the modulating means has distributed parameters that are electronically controlled and arranged along the hollow body upstream and downstream of the third piston,
    wherein the adjustment means is provided with the third piston that is movable along the first cylindrical portion and the second cylindrical portion, and
    wherein the third piston forms a first isolated air chamber between the first piston and the third piston and a second isolated air chamber between the third piston and the second piston.

2. The generator according to claim 1, wherein the adjustment means have concentrated parameters and comprise a linear damping member adjustable and coupled in parallel with a linear elastic member.

3. The generator according to claim 2, wherein the impulsive actuating means comprise a first tank, a compressor connected fluidly to the first tank and electronically to the control unit, a first valve electronically controlled by the control unit and arranged between the first tank and the hollow body behind the first piston to drive the first piston fluidly along the first cylindrical portion.

4. The generator according to claim 3, wherein first cylindrical portion has a first pressure sensor located upstream of the third piston and the second cylindrical portion has a second pressure sensor located downstream of the third piston, wherein the first sensor and the second sensor (64) are electronically connected to the control unit.

5. The generator according to claim 4, further comprising an exhaust valve that is associated with the first cylindrical portion and arranged between the first piston and the third piston.

6. The generator according to claim 1, wherein the second cylindrical portion has a first part that houses the third piston, wherein the second cylindrical portion has a section that is identical to a section of the first cylindrical portion, wherein the second cylindrical portion has a second part that houses the second piston and carries the acoustic diffuser member, wherein the first part and the second part are separated by a wall dividing the hollow body, wherein the wall has a hole engaged by the rod.

7. The generator according to claim 6, wherein in the actuating means comprise a second tank connected fluidly to the hollow body by a second valve, wherein the second valve is electronically controlled by the control unit and also connected hydraulically to a pump that is electronically controlled by the control unit.

8. The generator according to claim 7, wherein the modulating means comprise a third valve electronically controlled by the control unit and arranged between the second tank and the first cylindrical portion between the first piston and the third piston, the generator further comprising:
    a fourth valve electronically controlled by the control unit, wherein the fourth valve is arranged between the second tank and the first part; and
    a fifth valve electronically controlled by the control unit, wherein the fifth valve is arranged between the second tank and the second part.

9. The generator according to claim 8, wherein the modulating means comprise a first discharge valve electronically controlled by the control unit and a second discharge valve electronically controlled by the said control unit arranged between the first cylindrical portion and the first part, the generator further comprising:

a third sensor electronically controlled by the control unit being associated with the second part between the third piston and the second piston; and a fourth sensor associated with the acoustic diffuser member and controlled by the electronic control unit.

10. The generator according to claim 9, wherein the actuating means comprise at least one electrodynamic actuator associated with at least one of the first piston, second piston, and third piston for the respective independent actuation.

11. The generator according to claim 1, further comprising:

acoustic detection means for detecting marine mammals at a relative distance from the acoustic diffuser member, wherein the control unit is electronically connected to the actuating means and the acoustic detection means in such a way that the control unit is able to condition respective displacement parameters of the said second piston on the basis of surveys for the presence of mammals around the acoustic diffuser member by the acoustic detection means.

12. A method for generating acoustic waves in submarine environments by a first piston housed inside a hollow body that extends longitudinally along an axis between a first closed end and a second end that has a diffuser member, wherein the hollow body has a first cylindrical portion delimited by the first end that houses the first piston and a second cylindrical portion delimited by the second end that houses a second piston in a freely axially sliding manner, wherein the second piston is mechanically free from the first piston and has a face that faces the diffuser member (1020), and an impulsive actuating means associated with the first piston to move the first piston towards the second piston, the method comprising:

longitudinally moving the first piston toward the second piston with the actuating means;

conditioning a longitudinal motion of the second piston to and from the first piston with an adjustment means interposed between the first piston and the second piston, wherein the adjustment means comprises a rod that rigidly connects a third piston to the second piston and a modulating means or modulating the pressure acting on the second piston, wherein the modulating means has distributed parameters that are electronically controlled with a control unit and arranged along the hollow body upstream and downstream of the third piston, wherein the third piston is arranged between the first piston and the second piston to isolate a first air chamber and a second air chamber that are placed in series inside the hollow body.

13. The method according to claim 12, the method further comprising:

fluidly sealing the second chamber;
pressurizing the first chamber; and
discharging the first end.

14. The method according to claim 13, further comprising:

fluidly sealing the first end;
discharging the first chamber; and
pressurizing the second chamber.

15. The method according to claim 12, wherein the second chamber is divided into two parts having different transverse sections by a wall that is between the third piston and the second piston; the method further comprising:

pressurizing the first end;
discharging the first chamber;
discharging the first part; and
pressurizing the second part.

16. The method according to claim 12, wherein the second chamber is divided into two parts having different transverse sections by a wall that is between the third piston and the second piston; the method further comprising:

pressurizing the first end;
discharging the first chamber;
isolating the first part; and
pressurizing the second part.

17. The method according to claim 12, wherein the second chamber is divided into two parts having different transverse sections by a wall that is between the third piston and the second piston; the method further comprising:

pressurizing the first end;
isolating the first chamber;
releasing the first part; and
pressurizing the second part.

18. The method according to claim 12, wherein the second chamber is divided into two parts having different transverse sections by a wall that is between the third piston and the second piston; wherein the method further comprises:

pressurizing the first end;
isolating the first chamber;
isolating the first part; and
pressurizing the second part.

19. The method according to claim 12, wherein the second chamber is divided into two parts having different transverse sections by a wall that is placed between the third piston and the said second piston; and the method further comprising:

pressurizing the first end;
isolating the first chamber;
isolating the first part; and
isolating the second part.

* * * * *